F. W. BURPEE.
CONVEYER.
APPLICATION FILED JAN. 21, 1914.
1,110,480.
Patented Sept. 15, 1914.
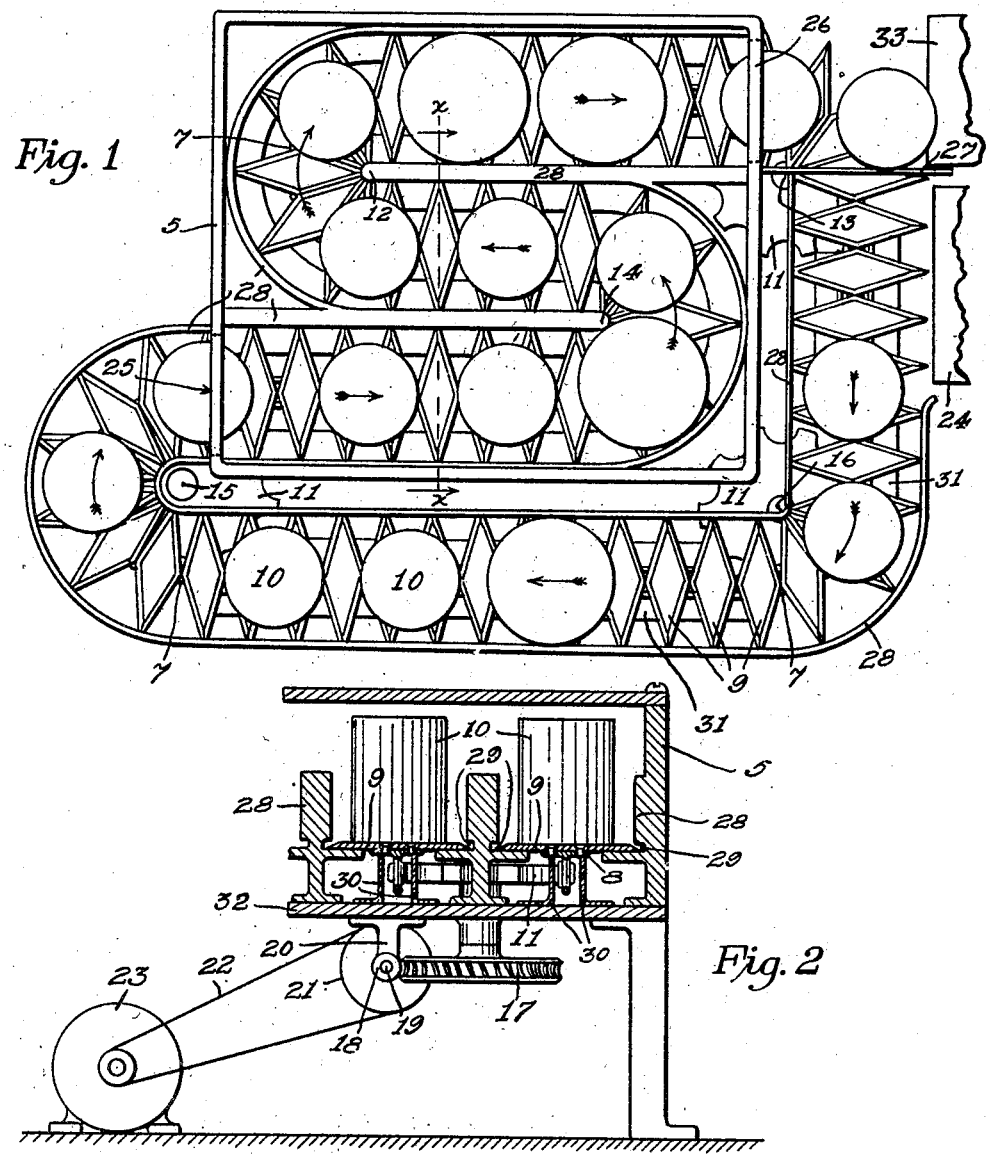
Fig. 1
Fig. 2
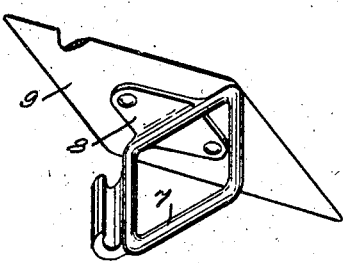
Fig. 3
WITNESSES:
F. C. Matheny
Frank Warren
INVENTOR
Frank W. Burpee
BY
C. D. Hoskins
ATTORNEY

UNITED STATES PATENT OFFICE.

FRANK W. BURPEE, OF BELLINGHAM, WASHINGTON.

CONVEYER.

1,110,480.

Specification of Letters Patent. Patented Sept. 15, 1914.

Application filed January 21, 1914. Serial No. 813,404.

*To all whom it may concern:*

Be it known that I, FRANK W. BURPEE, a citizen of the Dominion of Canada, residing at Bellingham, in the county of Whatcom and State of Washington, have invented a certain new and useful Improvement in Conveyers, of which the following is a specification.

My invention relates to improvements in mechanical conveyers within which are embodied sprocket chains and the object of my improvement is to provide a conveyer of this class wherein a sprocket chain is disposed on sprocket wheels whose axes are vertical whereby the plane of said sprocket chain shall be vertical to permit the attachment of a carrier plate to the upper edge of each link of said sprocket chain in such manner that the plane of said carrier plate shall be horizontal, thus to adapt such carrier plate to receive and carry packages of merchandise; and a further object of my improvement is to adapt the carrier plates, so attached to the links of such a conveyer chain, to permit such conveyer chain to travel smoothly when reversing the direction of its movement by turning around a sprocket wheel of a small diameter notwithstanding its association with said carrier plates, such chain and plates being provided with means for guiding them in their movements and protecting them from accidental contact with objects that might otherwise get in their path. I accomplish these objects by devices illustrated in the accompanying drawings wherein—

Figure 1 is a plan view of a conveyer embodying my invention as it may appear when employed in connection with an exhaust box similar to those that are used in the operation of canning food products, as fish, fruit, vegetables and the like; Fig. 2 is a view in vertical section of a portion of the same on broken line $x$, $x$ of Fig. 1, and Fig. 3 is a view in perspective of one of the chain links, with a carrier plate attached thereto, which is embodied in my invention.

Like reference numerals indicate like parts throughout the drawings.

I have illustrated a conveyer embodying my invention as employed in connection with an exhaust box similar to the exhaust boxes used by canneries in the operation of canning food products.

Referring to the drawings, 5 is the frame of an exhaust box through which exhaust box may travel a conveyer which comprises a plurality of sprocket chain links 7, hooked together in a well known manner to form a sprocket chain, one of which links 7 is more clearly shown in Fig. 3, and each of which links 7 is provided on its uppermost edge, and integral therewith, with a flange-like plate-seat 8 which is disposed to extend crosswise of such edge in a horizontal plane and upon which plate-seat 8 is securely attached a diamond shaped carrier-plate 9, with its plane in a horizontal position and at right angles with the plane of the link 7 to adapt it to serve conjointly with adjacent carrier-plates 9 to receive and carry in its travel, objects, like the cans 10 of food products, that may be placed thereon, as shown in Figs. 1 and 2. The conveyer chain is thus formed of the connected links 7, with their several carrier-plates 9 attached thereto, to make an endless sprocket chain belt which is disposed to extend successively from one to another of different sprocket wheels 11, to engage with and to be supported by the teeth thereof, which sprocket wheels 11 are disposed each with its vertical axis in line with a different one of the points 12, 13, 14, 15 and 16, as indicated in Fig. 1.

The sprocket wheels, whose axes are respectively located at points 12 and 14 of Fig. 1, are not shown in Fig. 1, but the sprocket wheel 11, shown in Fig. 2, is identical with the sprocket wheel whose axis is located at the point 14 of Fig. 1.

Referring to Fig. 2, a worm gearwheel 17 is fixed upon the shaft upon which the sprocket wheel 11 is mounted and such worm gearwheel 17 engages with a worm-screw pinion 18 that is fixed on a shaft 19 that is supported by a bearing bracket 20, upon which shaft 19 is mounted a pulley 21 which is connected with a motor 23 by a belt 22 whereby motion may be communicated through the sprocket wheel 11 whose axis is in a line of the point 14 of Fig. 1, to cause such conveyer to travel in the direction of the arrows in Fig. 1, whereby when objects like cans 10, of fruit products, are moved from a table 24, whose surface registers with the top surface of the carrier-plates 9 on to said carrier plates 9, the conveyer in its travel will convey such cans 10 from such table 24, in the direction of the arrows, to enter the exhaust box at the entrance point 11

25 and be conveyed therefrom to turn around the point 14, thence to be carried in a reverse direction to turn around the point 12 where their direction is again reversed to make their exit from the exhaust box through exit 26, and upon such exit such cans 10 will engage with a deflecting guide 27 which will guide such cans 10 off the carrier-plates 9 on to the surface of a receiving table 33. Thus objects like cans 10 may be fed from the table 24 on to the carrier-plates 9 of the conveyer and conveyed through the exhaust box at any desired rate of speed and be deposited upon the receiving table 33. Thus, in a well known manner, such cans 10, by their passage through the exhaust box are subjected to the heat therein whereby any air contained in them will be expanded and forced out of a minute vent hole commonly provided in the top of each of them which vent holes may be immediately sealed with solder upon reaching the table 33.

To confine the cans 10 in their position on the carrier-plates 9 I have provided side guides 28 and such side guides 28 are provided with a groove 29 disposed opposite the pointed portions of the carrier-plates 9 within which grooves 29 such pointed portions of said carrier-plates 9 project to travel therein and thus be prevented from catching or engaging with anything.

To guide and support the sprocket chain of connected links 7 in its travel between adjacent sprocket wheels 11, I have provided angular bars 30 disposed parallel with each other, one on each side of the sprocket chain, which angular bars 30 are secured to the floor 32 of the exhaust box, as shown in Fig. 2, the top edge surface of such angular bars 30 serving as a support for the plate-seat 8 of each of the links 7, the under surfaces of said plate-seats 8 being disposed to engage with and slidingly travel on said top edge surfaces of said angular bars 30, and such angular bars 30 as are disposed without the exhaust box are secured to base-plates 31 to be supported thereby. By such construction the sprocket chain, even if it be slack on the sprocket wheels 11, is prevented from sagging in any portion of the distance between adjacent ones of said sprocket wheels 11 by means of said angular bars 30.

The edges of the top surface of each of the carrier-plates 9 may be rounded or they may be beveled as shown in Figs. 2 and 3, whereby a can 10 may smoothly slide on and off the top surface of said carrier-plates 9.

The novel angular form of the diamond shaped carrier-plates 9 and the position of each of them on the top edge of a link 7 constitute most important features of my invention, since, obviously, by reason of such novel shape of such carrier-plates 9, and their positions on the sprocket chain, they may be of large area to adapt them better to receive and carry the cans 10 without preventing the sprocket chain from making an abrupt turn when said sprocket chain reverses its direction of travel by turning, either to the right or to the left, around a sprocket wheel of small diameter.

Of course a sprocket chain conveyer embodying my invention may be employed in connection with devices other than exhaust boxes when it is desired to carry objects in a path that abruptly reverses its direction by turning first to the right and then to the left and my invention may be associated with sprocket chains whose links are of one of many different well known forms instead of with a sprocket chain whose links are like the links illustrated in Fig. 3.

What I claim is:

1. In a conveyer of the class described, the combination with a plurality of sprocket wheels mounted upon vertically-disposed axes, of a chain belt, a plurality of diamond-shaped carrier plates secured to the upper edge of said belt, and a supporting trackway comprising oppositely-disposed confronting angle-plates upon the upper edges of which the said carrier plates are slidably supported, and vertically-disposed guideways grooved on their inner sides to receive the ends of said plates.

2. The combination with the frame of the exhaust box of canning apparatus provided with grooved side guides, of sprocket wheels mounted upon vertically-disposed axes, a chain belt engaging said wheels, a series of diamond-shaped carrier-plates secured to the upper edge of said belt, and a supporting trackway comprising oppositely-disposed confronting angle plates upon the upper parallel edges of which the said carrier-plates are slidably supported to bring their ends into horizontal alinement with the grooves of said side guides.

It witness whereof I hereunto subscribe my name this 6th day of January, A. D., 1914.

FRANK W. BURPEE.

Witnesses:
A. K. DAGGETT,
C. W. CARTER.